March 6, 1945.   V. PIERCE   2,370,912
LOCK WASHER
Filed Jan. 12, 1944

Verlin Pierce
INVENTOR.

BY
ATTORNEYS.

Patented Mar. 6, 1945

2,370,912

UNITED STATES PATENT OFFICE 2,370,912

LOCK WASHER

Verlin Pierce, Windfall, Ind.

Application January 12, 1944, Serial No. 518,009

2 Claims. (Cl. 151—36)

This invention relates to lock washers, the primary object of the invention being to provide a washer used in conjunction with a nut and bolt, which will bite into the surface of the nut and positively interlock with the work, when pressure is brought to bear on the washer, incident to the tightening of the nut on the bolt, effectively securing the nut against unscrewing or loosening.

Another object of the invention is to provide a lock washer having teeth which will present wide biting surfaces, to insure an exceptionally strong and durable locking result.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
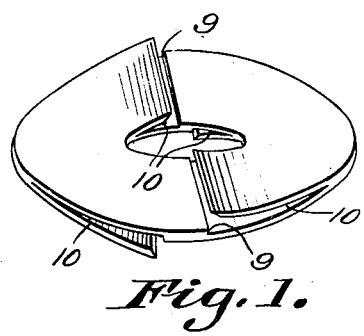
Figure 1 is a perspective view of a washer constructed in accordance with the invention.

Referring to the drawing in detail, the surfaces of the washer are cut throughout their width, and through substantially one-half of the thickness of the washer forming radial shoulders 9. The body portion of the washer is also cut as at 10, the cut portions 10 extending appreciable distances from the shoulders, on opposite sides of the washer. The portions of the washer separated by the cuts 10, are bent laterally in opposite directions, and the wide nut-engaging ends thereof are beveled, providing sharp blades adapted to bite into the nut and work with which the washer is used.

Figure 2:
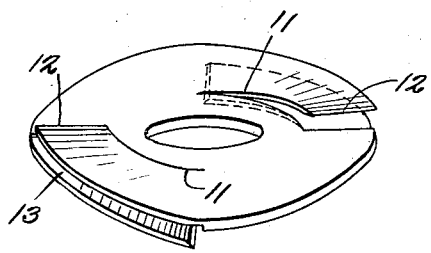
Figure 2 is a modified form of lock washer.

In the form of the invention as shown by Fig. 2, radial slits 11 are provided at opposite sides of the washer, and the body portion of the washer is cut at 12, the cut portions 12 extending through substantially one-half of the thickness of the washer. The washer is now cut at 13, the cut portions 13 extending from the adjacent slots or cuts 12, and the portions of the body separated by these cuts 12 and 13 being spread apart in opposite directions providing teeth. Because these teeth are formed on opposite sides of the washer, the gripping action of the teeth will be evenly distributed to cause the washer to seat perfectly.

The edges of these spring teeth are beveled to insure the edges thereof biting into the nut and work with which the washer is used.

In constructing the washer, it might be stated that the washer is made from sheet metal or other suitable material having the properties of spring steel, particularly in regard to hardness and resilience, and the construction of the washer is such that a number of sharp spring teeth are provided to bite into the nut and work to prevent reverse movement of the nut, after the nut has been properly seated.

What is claimed is:

1. A locking washer comprising an annular body portion having a central bolt opening, and having spaced radial slots extending inwardly from the periphery thereof at offset sides of the body portion, said slots being of depths equal to one-half of the thickness of the body portion, and having arcuate-shaped slots connecting adjacent radial slots, the portion between the radial slots being split horizontally from the outer edge of the body portion to the arcuate-shaped slots, providing pairs of outwardly extended fingers, at opposite sides of the body portion and the free ends of said fingers being beveled.

2. A locking washer comprising an annular body portion having a central bolt opening, and having spaced radial slots extending substantially one-half of the thickness of the body portion and being disposed at opposite side faces of the body portion, the portions of the body adjacent to the radial slots being split horizontally from the outer edge thereof, providing a pair of spring fingers on opposite sides of the body portion, and the free ends of said fingers being beveled providing sharp biting edges.

VERLIN PIERCE.